United States Patent [19]

Jacks

[11] Patent Number: 5,025,542

[45] Date of Patent: Jun. 25, 1991

[54] BUSHING EXTRACTOR/INSTALLER

[76] Inventor: Floyd B. Jacks, 219 NE. 82nd Terr., Kansas City, Mo. 64118

[21] Appl. No.: 532,874

[22] Filed: Jun. 4, 1990

[51] Int. Cl.[5] .............................................. B23P 19/04

[52] U.S. Cl. .......................................... 29/252; 29/263

[58] Field of Search ................. 29/252, 251, 263, 264, 29/234, 237, 279; 254/29 A, 29 R

[56] References Cited

U.S. PATENT DOCUMENTS

| | | | |
|---|---|---|---|
| 1,310,270 | 7/1919 | Atzberger | 29/263 |
| 1,465,124 | 8/1923 | Gardner | 29/263 |
| 1,589,862 | 6/1926 | Quint | 29/263 |
| 3,044,157 | 7/1962 | Fink | 29/252 |
| 3,110,958 | 11/1963 | McCord | 29/263 |
| 4,182,011 | 1/1980 | Bretzger et al. | 29/252 |
| 4,489,471 | 12/1984 | Gregory . | |
| 4,586,229 | 5/1986 | Pendola . | |
| 4,610,066 | 9/1986 | Cline . | |
| 4,646,411 | 3/1987 | Hankins . | |
| 4,711,011 | 12/1987 | Nugier . | |
| 4,763,394 | 8/1988 | DeCato et al. . | |

*Primary Examiner*—Robert C. Watson

*Attorney, Agent, or Firm*—Litman, McMahon & Brown

[57] ABSTRACT

A bushing extractor/installer apparatus for extracting an existing bushing having an axial throughbore from a vehicular suspension spring and installing a replacement bushing therein. The apparatus comprises a threaded rod, a shell portion, and a pair of circular disks: one disk for extraction of the existing bushing, the other disk for installation of the replacement bushing. The threaded rod is slidably sequentially inserted through a hydraulic ram having a throughbore, the shell portion with a cavity thereof being directed toward the bushing to be extracted, the bushing and the extraction disk. The shell portion being larger than and the extraction disk being smaller than the spring opening containing the bushing, the ram, in cooperation with the threaded rod and the extraction disk, urges the bushing into the cavity of the shell portion. The threaded rod is then slidably sequentially inserted through the hydraulic ram, the shell portion with the cavity thereof directed away from the bushing to be installed, the replacement bushing, the spring and the installation disk. The installation disk being larger than and the replacement bushing being substantially the same size as the opening in the spring, the ram, in cooperation with the threaded rod and the installation disk, urges the replacement bushing into the spring opening, completing the installation of the replacement bushing therein.

8 Claims, 2 Drawing Sheets

BUSHING EXTRACTOR/INSTALLER

BACKGROUND OF THE INVENTION

The present invention relates to an apparatus for on-vehicle extraction of an existing, frictionally secured bushing from a suspension spring and for subsequent installation of a replacement bushing therefor.

From time to time, various parts on vehicles or equipment must be replaced to assure continued performance thereof. This circumstance equally applies to suspension spring bushings, one of which is generally frictionally installed near each end of a leaf spring for supporting the heavy loads associated with semi-tractor trailer, over-the-road units.

Because of the substantial loads and forces involved with such systems, the various interrelating components of the suspension system are massive. Replacement of an essential part, such as one or more of the bushings, mandates supporting the vehicular structure while the suspension mechanisms are disconnected to provide access for the necessary repair or maintenance work.

Previously, replacement of a bushing generally required disconnecting various brackets and both ends of the spring from the vehicle. Then, the spring, which in itself is quite massive, had to be manhandled and maneuvered free of the surrounding components which is generally performed only with great difficulty due to the confining circumstances provided by the limited space available beneath the vehicle. The removed spring with its embedded bushings is then carried to other equipment which has the necessary design and capacity needed to apply the substantial forces required to extract the existing bushing from the end of the spring.

After extracting the existing bushing from the spring, a replacement bushing is then forced into place with the equipment. The spring is then carried back to the vehicle, maneuvered into position generally with substantial difficulty, and the ends thereof and the various brackets reinstalled. This procedure is time consuming, labor intensive, dirty and dangerous.

What is needed is an apparatus whereby an existing bushing can be quickly and conveniently extracted from the spring after disconnecting only one end of the spring but generally without having to disconnect any other brackets or connections and whereby a replacement bushing can be quickly and conveniently installed in the spring while the spring remains in relatively close proximity to its operable location, thereby avoiding the generally difficult maneuvering of the spring in and around the components of the understructure of the vehicle during removal and reinsertion thereof.

SUMMARY OF THE INVENTION

A bushing extractor/installer is provided to remove or extract an existing, frictionally secured bushing from an encirclement or enclosure near the end of a suspension spring of a vehicle. After removing a pin or bolt which passes through an axial throughbore of the bushing securing the spring and the bushing to the supporting framework of the vehicle, the freed end of the spring is displaced relative to the vehicle whereby access is provided to both ends of the bushing.

A threaded rod is then slidably sequentially inserted through coaxially aligned bores of a hydraulic ram, a shell portion, the existing bushing, and an extraction disk, which has an outside diameter which is smaller then the inside dimensions of the encirclement opening of the spring in its relaxed state. The shell portion contains a cavity having a diameter which is larger than the outside diameter of the bushing but which is substantially smaller than the outside diameter of the encirclement of the spring such that the of the shell portion bears against the spring encirclement. The shell portion is placed on the threaded rod in a receiving or extraction orientation such that the cavity is spaced immediately adjacent to the existing bushing.

After threadedly advancing a nut on one end of the threaded rod, the hydraulic ram is activated by manipulating a pump in flow communication therewith such that a cylinder of the hydraulic ram bears against the nut on the immediately adjacent end of the threaded rod. As a result, the shell portion is caused to be securely lodged between the base of the ram and the spring encirclement containing the existing bushing.

Since the shell portion is larger than, and the extraction disk is smaller than, the opening of the spring encirclement, further manipulation of the pump causes the threaded rod to urge the extraction disk through the opening of the spring encirclement, pushing the bushing therealong toward the shell portion. This procedure is continued until the extraction disk has substantially passed through the encirclement opening and the existing bushing is deposited in the cavity of the shell portion, thereby extracting the existing bushing from the spring.

The hydraulic fluid is then drained from the ram back to the pump, allowing the ram to be returned to its original, unextended configuration. The nut adjacent to the extraction disk is then threadedly removed from the threaded rod. The shell portion is then slidably removed from the threaded rod, and the existing bushing is removed from the cavity thereof and discarded.

To install the replacement bushing, the threaded rod with the hydraulic ram thereon is inserted sequentially through the shell portion in a reversed or installation orientation (where the cavity thereof faces toward the ram), the replacement bushing, the encirclement opening, and an installation disk. The installation disk has an outside diameter which is substantially larger than the general dimensions of the opening through the spring encirclement.

A nut is then threadedly advanced on the end of the threaded rod immediately adjacent to the installation disk and the hydraulic ram is activated while the threaded rod is manually maintained in axial alignment with the opening through the spring encirclement. This procedure is continued until the shell portion and the replacement bushing are firmly lodged in tandem between the base of the hydraulic ram and the spring encirclement.

Since the installation disk is larger than and since the diameter of the replacement bushing is substantially the same size as the encirclement opening, further manipulation of the hydraulic pump causes the threaded rod to urge the replacement bushing through the opening of the spring encirclement. This procedure is continued until the bushing is substantially contained within the encirclement opening, thereby completing the installation of the replacement bushing in the spring. Both the shell portion and the installation disk serve as a stop to prevent over-insertion of the replacement bushing into the encirclement opening.

Upon completion of the installation of the bushing, the hydraulic fluid is once again drained from the ram back to the pump, allowing the ram to return to its original, unextended configuration. The nuts are then removed from the ends of the threaded rod, which is then slidably withdrawn from the replacement bushing. It is then a relatively simple matter to realign the end of the spring with its newly installed bushing to its normal operative configuration, inserting a bolt through the throughbore of the replacement bushing, and threadedly securing the spring in place.

Typically, the entire procedure saves time, reduces labor costs, and is relatively clean and safe in comparison with prior art procedures.

OBJECTS OF THE INVENTION

Therefore, the objects of the present invention are: to provide an apparatus which extracts existing, frictionally secured bushings from encirclements of a suspension spring of vehicles and equipment without removing such spring; to provide such an apparatus which installs replacement, frictionally secured bushings in such spring encirclements; to provide such an apparatus which is sufficiently compact to permit ease of operation in the confined space beneath such a vehicle; to provide such an apparatus which substantially reduces the amount of time required to extract such an existing bushing and install such a replacement bushing; to provide such an apparatus which is relatively lightweight; to provide such an apparatus which eliminates the need to entirely remove a spring from a vehicle or equipment; to provide such an apparatus which is relatively safe to use; and to generally provide such an apparatus which is relatively easy to use, simple to maintain, reliable in performance, inexpensive to manufacture, and which generally performs the requirements of its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
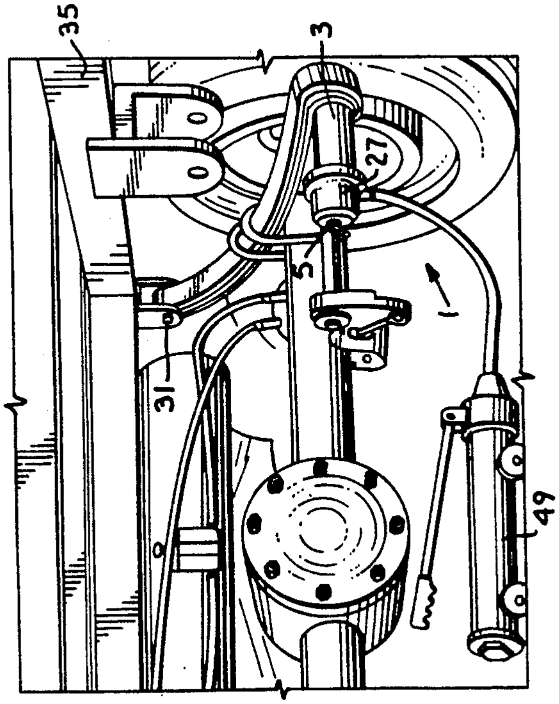
FIG. 1 is a perspective view of the underside of a vehicle utilizing a bushing extractor/installer apparatus in accordance with the present invention.
Figure 2:
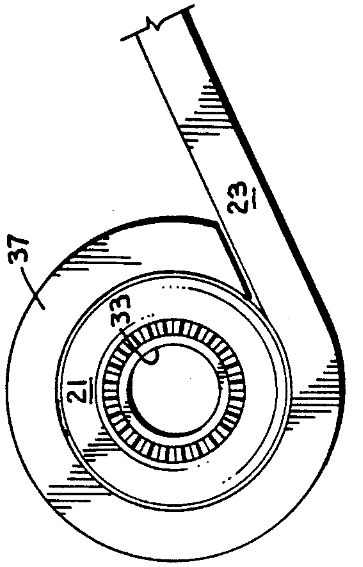
FIG. 2 is an enlarged and fragmentary side elevational view of a spring encirclement with a bushing.
Figure 3:
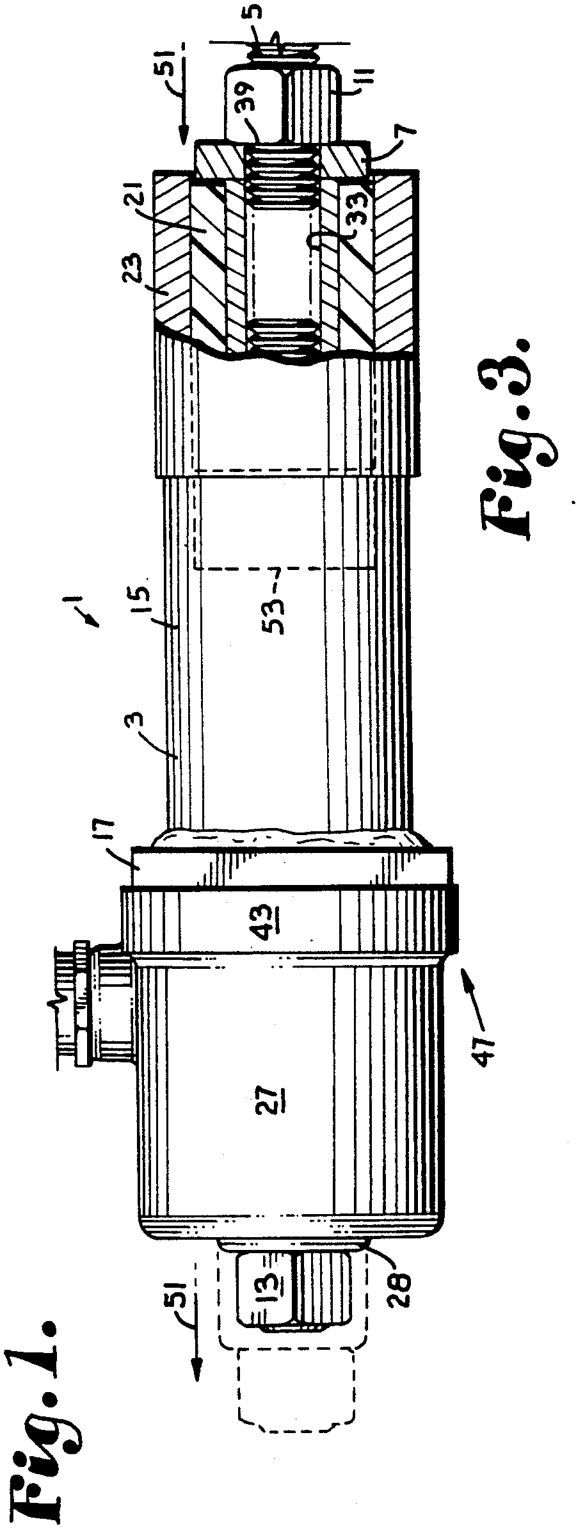
FIG. 3 is an enlarged and fragmentary side elevational view of the bushing extractor/installer apparatus with portions cut away to reveal details thereof, showing the apparatus just prior to extraction of the bushing in solid lines and the apparatus after the bushing has been partially extracted in phantom lines.
Figure 4:
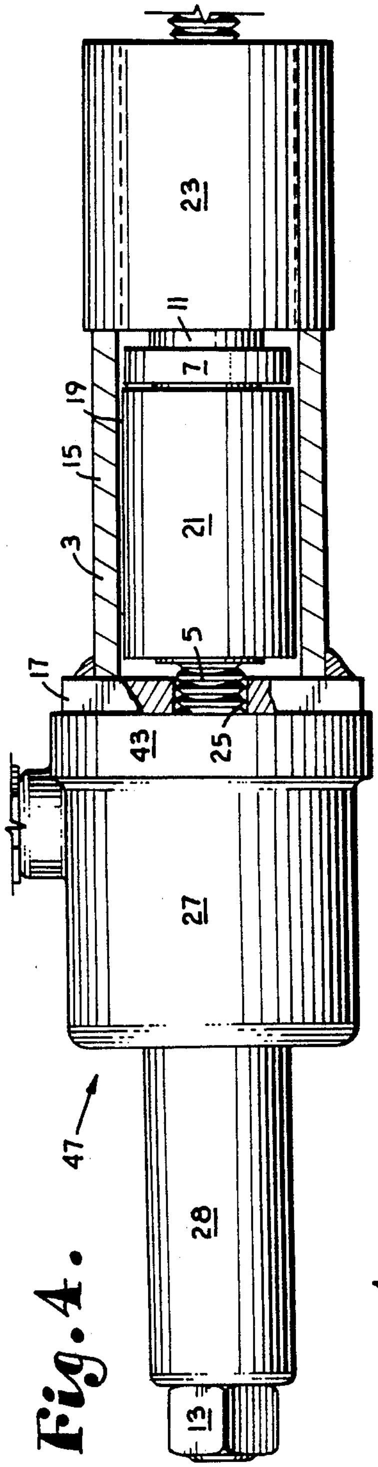
FIG. 4 is an enlarged and fragmentary side elevational view of the bushing extractor/installer apparatus with portions cut away to reveal details thereof, showing the apparatus after extraction of the bushing.
Figure 5:
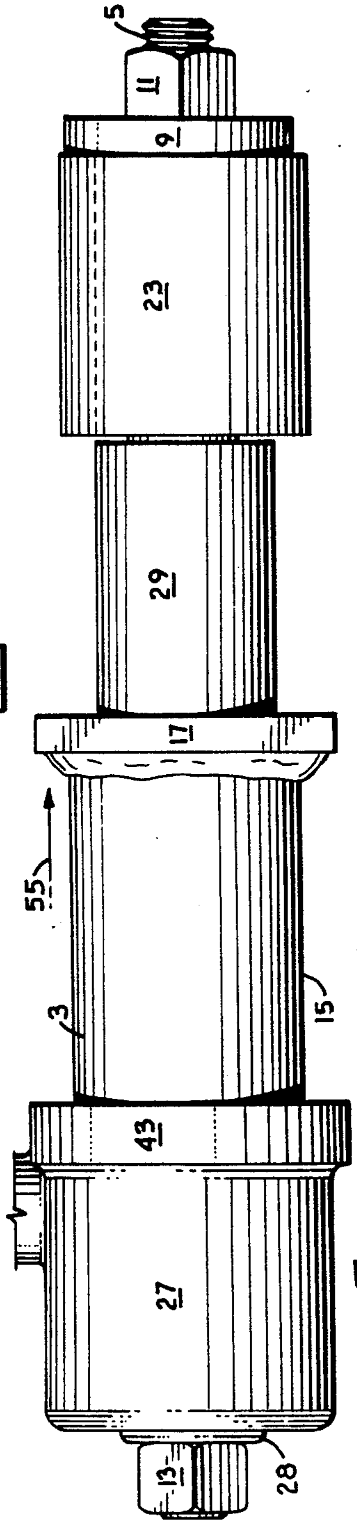
FIG. 5 is an enlarged side elevational view of the bushing extractor/installer apparatus, showing the apparatus just prior to installation of a replacement bushing.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to a bushing extractor/installer apparatus in accordance with the present invention, as shown in FIGS. 1 to 6. The apparatus 1 comprises a shell portion 3, a threaded rod 5, an extraction disk 7, an installation disk 9, and a pair of nuts 11 and 13.

The shell portion 3 comprises a receiver or body 15 and a butt plate 17. The body 15 is generally tubular or cylindrically shaped. The body 15 has an inner diameter forming a cavity 19 therein, with the diameter of the cavity 19 being greater than the diameter of a bushing 21 to be extracted in cooperation therewith. The body 15 has an axial length which is greater than the axial length of the bushing 21. The body 15 can be simply constructed from a relatively short section of appropriately sized, thick-walled steel pipe or the like. For example, in one application of the present invention, the bushing 21 in a truck suspension spring 23 has a diameter of approximately 2 $\frac{5}{8}$ inches and a length of approximately 3 $\frac{3}{4}$ inches. For that application, the body 15 has a length of approximately 4 $\frac{3}{4}$ inches and an outside diameter of approximately 3 $\frac{1}{2}$ inches, with the cavity 19 contained therein having a diameter of approximately 3 inches.

One end of the body 15 is rigidly secured to one side of the butt plate 17 by welding or the like. The butt plate 17 has a throughbore 25 which is axially aligned with the cavity 19. The diameter of the throughbore 25 is slightly greater than the diameter of the threaded rod 5 such that the threaded rod 5 can be slidably inserted therethrough. The butt plate 17 is constructed of rigid material, such as $\frac{1}{2}$"-thick plate steel, or the like.

A commercially available hydraulic ram 27, such as a 30-ton hydraulic ram as provided by Templeton, Kenly & Co., is used to overcome the frictional forces between the bushing 21 and the spring 23 as hereinafter described. The ram 27 has an axial centerbore (not shown) with a diameter slightly greater than the diameter of the threaded rod 5 such that the threaded rod 5 can be slidably inserted therethrough. The displacement or throw of a cylinder 28 of the ram 27 is substantially equal to or greater than the width of the spring 23.

The threaded rod 5 has sufficient tensile strength to withstand the force exerted by the ram 27 while the existing bushing 21 is being extracted from, or a replacement bushing 29 is being installed in, the spring 23. The diameter of the threaded rod 5 is dimensioned smaller than the diameter of an installation bolt or pin 31 which extends through an axial throughbore 33 of the bushing 21 for operably securing the spring 23 to a vehicle 35.

The threaded rod 5 has a length greater than the combined axial lengths of the ram 27, the shell portion 3, the replacement bushing 29, the width of the spring 23, the installation disk 9, and the pair of nuts 11 and 13. In one application of the apparatus 1, the threaded rod has a diameter of approximately ⅞" and a length of approximately 17 inches.

The extraction disk 7 has a diameter, which is smaller than the inside dimensions of an encirclement 37 of the spring 23 for containment of the bushing 21. The extraction disk 7 has an axial throughbore 39 having a diameter which is slightly larger than the outside diameter of the threaded rod 5, such that the threaded rod 5 can be slidably inserted therethrough. The installation disk 9 has a diameter which is substantially larger than the inside dimensions of the encirclement 37; preferably, the diameter of the installation disk 9 is similar to the outside diameter of the encirclement 37. The installation disk 9 has an axial throughbore 41 having a diameter which is slightly larger than the outside diameter of the threaded rod 5, such that the threaded rod 5 can be slidably inserted therethrough. The extraction disk 7 and the installation disk 9 are constructed of rigid material, such as ½"-thick steel, or the like. In one application of the present invention, the extraction disk 7 has a diameter of approximately 2 ½ inches and the installation disk 9 has a diameter of approximately 3 ¼ inches.

In an actual application of the present invention, one or more supporting jacks or other devices (not shown) are appropriately spaced under the equipment or vehicle 35. Then one end of the spring 23 is disconnected from the vehicle 35, such as by removing a bolt or pin similar to the bolt 31, freeing one end of the spring 23 whereby that end can be displaced relative to the vehicle 35, whereby ready access is provided to both exposed ends of the bushing 21.

The threaded rod 5 is then manually inserted rightwardly (as viewed in FIG. 1) through the bore 33 of the bushing 21 which has been vacated by the bolt 31. The extraction disk 7 is then telescoped on the end of the threaded rod 5 protruding through the right end of the bushing 21 and is secured thereon by threadedly advancing the nut 11 on the threaded rod 5.

The shell portion 3 is then telescoped on the other or left end of the threaded rod 5 by inserting the threaded rod 5 first through the cavity 19, then through the bore 25 of the butt plate 17. The shell portion 3 is slidably advanced along the threaded rod 5 until the body 15 abuts against the encirclement 37 of the spring 23 such that the cavity 19 is disposed immediately adjacent to the bushing 21 contained within the spring encirclement 37. This particular orientation of the shell portion 3 may hereinafter be referred to as the extraction orientation of the shell portion 3.

The ram 27 in an unextended configuration is then telescoped over the end of the threaded rod 5 such that a base 43 thereof abuts against the butt plate 17. The ram 27 is oriented such that, when activated, the cylinder 28 of the ram 27 moves leftwardly or away from the spring 23. The nut 13 is then threadedly advanced on the threaded rod 5 to secure an entire assembly 47 comprising the threaded rod 5, the hydraulic ram 27, the shell portion 3 in its extraction orientation, the bushing 21, and the extraction disk 7, together as a unit.

A pump 49 in flow communication with the ram 27 is then manipulated to activate the ram 27, which urges the threaded rod 5 leftwardly relative to the ram 27, as indicated by the arrow referenced by the numeral 51. Since the shell portion 3 is larger than the opening through the encirclement 37 thereby preventing rightward movement of the ram 27 and the shell portion 3 and since the extraction disk 7 is smaller than the opening through the encirclement 37, the threaded rod 5, the extraction disk 7, and the nut 11 are displaced leftwardly. As the extraction disk 7 traverses the opening through the encirclement 37 of the spring 23, the bushing 21 is pushed leftwardly ahead of the extraction disk 7, as illustrated by the phantom lines referenced by the numeral 53 in FIG. 3, and is subsequently deposited in the cavity 19 of the shell portion 3, thereby completing the extraction of the bushing 21 from the spring 23. When the bushing 21 is deposited in the shell portion 3, the assembly 47 is no longer secured to the spring 23 and falls free from the spring 23.

The hydraulic fluid is then drained from the ram 27 to the pump 49 such that the cylinder 28 of the ram 27 returns to its unextended configuration. Then, the nut 11 is removed from the end of the threaded rod 5 and the extraction disk 7 and the shell portion 3, along with the bushing 21 contained in the cavity 19 of the shell portion 3, are slidably removed from the threaded rod 5. The bushing 21 is then removed from the cavity 19, the shell portion 3 is reversed end-for-end and re-telescoped over the threaded rod by inserting the threaded rod 5 first through the cavity 19, then through the bore 25 of the butt plate 17, such that the cavity 19 is operably directed away from the spring 23. This particular orientation of the shell portion 3 may hereinafter be referred to as the installation orientation of the shell portion 3. The shell portion 3 is slidably advanced along the threaded rod 5 until the body 15 abuts against the base 43 of the ram 27.

The replacement bushing 29 is then telescoped over the threaded rod 5 and slidably advanced therealong until the bushing 29 abuts against the butt plate 17. The threaded rod 5 is then inserted through the opening of the spring encirclement 37 and the installation disk 9 is telescoped on the protruding end thereof. The nut 11 is then threadedly advanced on the threaded rod 5 to secure the threaded rod 5, the hydraulic ram 27, the shell portion 3 in its installation orientation, the replacement bushing 29, and the installation disk 9, together as a unit.

The pump 49 is then manipulated to activate the ram 27 which urges the threaded rod leftwardly relative to the ram 27. Since the diameter of the installation disk 9 is larger than the opening through the encirclement 37 thereby preventing leftward movement of the threaded rod 5 and since the diameter of the replacement bushing 29 is substantially equal to the diameter of the opening through the encirclement 37, the shell portion 3 and the replacement bushing 29 are displaced rightwardly ahead of the ram 27, as illustrated by the arrow referenced by the numeral 55 in FIG. 5. An operator of the apparatus 1 manually maintains the threaded rod 5 and the replacement bushing 29 in coaxial alignment with the opening in the spring encirclement 37 until the bushing 29 begins to enter the spring encirclement 37 at which time the bushing 41 maintains self-alignment therewith without further assistance from the operator.

Figure 6:
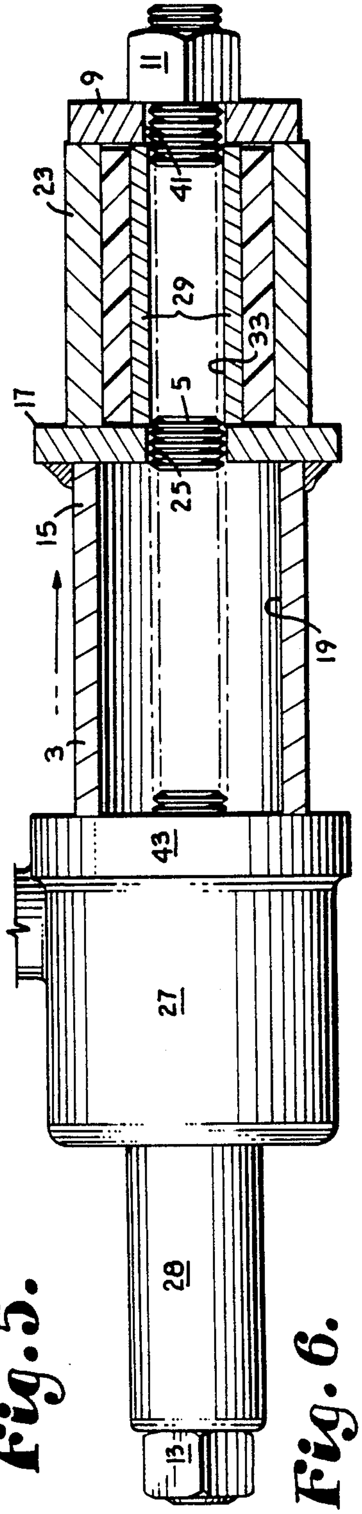
FIG. 6 is an enlarged side elevational view, partially in cross-section, of the bushing extractor/installer apparatus, showing the apparatus after installation of the replacement bushing in accordance with the present invention.

The aforedescribed installation procedure continues until the bushing 29 is substantially centered within the spring encirclement 37 whereat the rightmost end of the bushing 29, as shown in FIG. 6, is spaced in close proximity to the installation disk 9. In fact, both the butt plate 17 and the installation disk 9 serve as stops to avoid over-insertion of the bushing 29 into the spring encirclement 37.

The hydraulic fluid is then drained from the ram 27 back to the pump 49 such that the cylinder of the ram 27 returns to its unextended configuration. Then, the nut 11 is removed from the end of the threaded rod 5 and the threaded rod 5, along with the ram 27 and the shell portion 3 thereon, is slidably removed from the bushing 29.

It is relatively straightforward to then appropriately space the spring 23 relative to the vehicle 35, appropriately insert a bolt, similar to the bolt 31, through the centerbore 33 of the bushing 29, and secure the spring 23 in place. Upon removal of the blocking, which was used to support the vehicle 35 while the existing bushing 21 was extracted and the replacement bushing 29 was installed, the repair or maintenance work is completed.

It is foreseen that the apparatus and method hereinbefore described can be adapted to a variety of applications for vehicles and equipment which require extraction or installation of frictionally fitting parts which have a throughbore. The uniquenesses of the apparatus described herein include, without limitation, compactness, portability and on-vehicle extraction and installation capability.

It is to be understood that while certain forms of the present invention have been illustrated and described herein, it is not to be limited to the specific forms or arrangement of parts described and shown.

What is claimed and desired to be secured by Letters Patent is as follows:

1. In extraction and installation apparatus for extraction of a first, existing bushing from a spring encirclement of a vehicle and for installation of a second, replacement bushing in said spring encirclement, the improvement comprising:

(a) portable on-vehicle extraction means in conjunction with a hydraulic ram for extracting said first bushing such that said extraction means is not thrust beyond said spring encirclement during said extraction of said first bushing; and (b) portable on-vehicle installation means in conjunction with said hydraulic ram for installing said second bushing such that said installation means is not thrust beyond said spring encirclement during said installation of said second bushing.

2. The extraction and installation apparatus according to claim 1 wherein:

(a) said portable on-vehicle extraction means comprise a shell portion having a cavity with larger cross-sectional and longitudinal dimensions than corresponding dimensions of said first bushing; said cavity of said shell portion spaced immediately adjacent to said first bushing during the extraction thereof.

3. The extraction and installation apparatus according to claim 2 wherein:

(a) said portable on-vehicle extraction means further comprise an extraction disk having smaller cross-sectional dimensions than corresponding dimensions of said first bushing.

4. The extraction and installation apparatus according to claim 3 wherein:

(a) said portable on-vehicle extraction means further comprise a rod adapted to cooperatively secure said hydraulic ram, said shell portion, said extraction disk and said first bushing thereon.

5. The extraction and installation apparatus according to claim 1 wherein:

(a) said portable on-vehicle installation means comprise a shell portion having a butt plate with an axial throughbore; said butt plate spaced immediately adjacent to said second bushing during installation thereof.

6. The extraction and installation apparatus according to claim 5 wherein:

(a) said portable on-vehicle installation means further comprise an installation disk having substantially larger cross-sectional dimensions than corresponding dimensions of an inside diameter of said spring encirclement.

7. The extraction and installation apparatus according to claim 6 wherein:

(a) said portable on-vehicle installation means further comprise a rod adapted to cooperatively secure said hydraulic ram, said shell portion, said installation disk and said second bushing thereon.

8. A bushing extractor/installer apparatus, in cooperation with a hydraulic ram having a throughbore dimensioned larger than a threaded rod hereinafter described, adapted, firstly, to extract an existing, cylindrically shaped bushing from an encirclement of a suspension spring of a vehicle and, secondly, to install a replacement, cylindrically shaped bushing in said encirclement comprising:

(a) a shell portion comprising a cylindrically shaped body and a butt plate; said body containing a cylindrically shaped cavity having a diameter dimensioned larger than the diameter of said existing bushing and having a length dimensioned larger than the length of said existing bushing; said butt plate having an axial throughbore having a diameter dimensioned larger than the diameter of said threaded rod, such that said threaded rod may be slidably inserted therethrough;

(b) a circularly shaped extraction disk having a diameter dimensioned smaller than the inside dimensions of said encirclement of said spring; said extraction disk having an axial throughbore dimensioned larger than the diameter of said threaded rod;

(c) a circularly shaped installation disk having a diameter dimensioned substantially larger than the inside dimensions of said encirclement of said spring; said installation disk having an axial throughbore dimensioned larger than the diameter of said threaded rod; and (d) the aforementioned threaded rod; said threaded rod having a pair of nuts; said threaded rod having a length larger than the composite axial length of said hydraulic ram, said shell portion, said replacement bushing, an axial length of said encirclement, said installation disk, and said pair of nuts; said apparatus configured such that said rod is not thrust beyond said encirclement during said extraction of said existing bushing; said apparatus configured such that said rod is not thrust beyond said encirclement during said installation of said replacement bushing.

* * * * *